3,228,917
METHOD OF POLYMERIZING OLEFINS WITH NICKEL OR COBALT SALT-ORGANOPHOSPHINE COMPLEX AND AN ACIDIC METAL HALIDE

Clifford W. Childers, Wayne, N.J., assignor to United States Rubber Company, New York, N.Y., a corporation of New Jersey
No Drawing. Filed Aug. 7, 1962, Ser. No. 215,258
14 Claims. (Cl. 260—84.1)

This invention relates to a polmerization catalyst, and to a method of polymerizing olefinically unsaturated monomers with such catalyst. More particularly, it relates to a catalyst based on a nickel or cobalt salt-organophosphine complex and an acidic metal halide type compound, for the homopolymerization or copolymerization of butadiene or similar 1-olefins.

The invention is especially concerned with a catalyst for polymerization of butadiene to a high molecular weight homopolymer or copolymer in which more than 40% and preferably more than 60% of the butadiene monomer units have the cis-1,4 configuration. Copolymers of butadiene with isoprene, styrene, isobutylene and propylene are among those which can be prepared by the invention. Homopolymers of the above-mentioned monomers can also be prepared. The term high molecular weight as used herein shall refer to a polymer having an intrinsic viscosity of at least 0.1 in benzene, which would correspond approximately to a number average molecular weight of at least 10,000.

The catalyst of this invention is obtained by the interaction of a metal salt-organophosphine complex of the formula $(R_3P)_2MX_2$, in which R is a hydrocarbon radical (e.g. phenyl or butyl), M is Ni or Co, and X is F, Cl, Br, I, or SCN, with a Friedel-Crafts catalyst. The term Friedel-Crafts catalyst includes acidic metal halides, that is metal halides having acidic properties ("Lewis acids"). Specific examples of metallic halides of this class are: $HgCl_2$, $BF_3 \cdot O(C_2H_5)_2$, $AlCl_3$, $AlBr_3$, $TiCl_4$, $FeCl_2$, $FeCl_3$, $ZnCl_2$, $SbCl_3$, $SbCl_5$, $BeCl_2$, $CdCl_2$, $CaCl_2$, $BF_3$, $GaCl_3$, $ZrCl_3$, $SnCl_4$, $MoCl_5$, $ZnBr_2$, etc. Such acidic metal halides may be represented by the formula $M'X'_n$ where $M'$ is a metallic element of valence $n$ whose halides are Lewis acids, and $X'$ is fluorine, chlorine or bromine.

The metal salt-phosphine complexes used in the invention are known materials, which may be prepared by the interaction of approximately 1 mole of metal salt $MX_2$ and 2 moles of the phosphine $R_3P$ in a suitable solvent, e.g., glacial acetic acid or butanol (see for example Venanzi, J. Chem. Soc. 1958, 722–724). The complexes used in the examples of the invention given hereinafter were well-defined crystalline materials, made substantially as described by Venanzi.

The active catalyst is prepared by mixing the two ingredients, $(R_3P)_2MX_2$ and the acidic metal halide, in solution or in suspension in an inert, dry solvent. The reaction is carried out in the absence of water, air, materials containing so-called "active hydrogen" (such as alcohols and acids), and any other material which inactivates the catalyst or prevents its formation. Satisfactory solvents include aromatic and saturated aliphatic hydrocarbons such as benzene, toluene, pentane, hexane, octane, petroleum fractions, cyclohexane, and the like, and halogen derivatives of such hydrocarbons, such as chlorobenzene, methylene dichloride, the alkyl chlorides and alkylene dichlorides, 1,2-dichloroethylene. The solvent should have a boiling point below 200° C., and preferably below 150° C., to facilitate its removal by evaporation from the finished polymer. The temperature at which the catalyst is made is not critical; usually temperatures in the range 0° C. to 50° C. are used, but temperatures outside this range may be used if desired.

The activity of the catalyst and its effectiveness in giving high reaction rate and good yield in polymerization are greatly enhanced by the addition of a small amount of a halohydrocarbon, such as the lower alkyl (e.g. 1–6 carbon atoms) chlorides and bromides (e.g., n-butyl chloride, methylene dichloride, ethyl bromide, ethylene dichloride, dichloroethylene), chlorobenzene, α-dichlorobenzene, and other analogous compounds. The halohydrocarbon may be added to the solvent in which the catalyst is prepared, or it may be added to the polymerization mixture at the start of the polymerization. Relatively small amounts of the halohydrocarbon are required; as little as 0.05 mole per mole of organo phosphine-metal salt complex in the catalyst will often produce a significant effect, and usually not more than 5 moles per mole of complex are required to give the full effect. Larger amounts are not harmful; in fact, the halohydrocarbons are suitable for use as solvents for preparation of the catalyst and for the polymerization.

The molar ratio of nickel or cobalt compound to acid metal halide in the catalyst is not critical, and may range from 10:1 to 1:100. However, ratios in the range 1:1 to 1:10 are usually found to give the best results, and are preferred.

The catalyst concentration in the polymerization mixture, expressed in terms of the nickel or cobalt content, may be as low as 1 milligram per liter. Concentrations in the range 0.01 to 1 gram of Ni or Co per liter are usually preferred.

The polymerization reaction is started by adding the monomer or monomers to the catalyst mixture, preferably within 24 hours after making the catalyst mixture. Additional solvent may be added if desired, before or concurrently with the monomer addition. The solvent may be any of those mentioned above as suitable for the process of forming the catalyst. The amount of solvent in the polymerization mixture is not a critical factor; one usually uses the minimum amount required to give a polymer solution which is fluid enough to be stirred and handled as a liquid at the end of the polymerization, when the desired conversion of monomer to polymer has been reached. Usually from 200 to 2000 parts by weight of solvent per 100 parts of polymer formed is used.

The polymerization may be carried out, with the exclusion of air, moisture, and other interfering materials, by any of the known methods of solution polymerization, such as the batch method, in which all of the ingredients are added at the start; methods in which one or more of the ingredients (catalyst, monomer, solvent) are added continuously or in increments during the course of the polymerization; and continuous methods, in which streams of the ingredients are joined to form a stream of reaction mixture, which passes into a reaction zone, and is withdrawn continuously from the reaction zone and treated to recover the polymer.

The temperature of the polymerization mixture may vary over a considerable range, depending on such factors as the particular catalyst and monomer, the concentrations of these ingredients, and the reaction rate desired. Usually a temperature in the range 0° C. to 100° C. will be found satisfactory. The reaction mixture is kept under a high enough pressure to maintain it in the liquid state; moderate pressures, in the range of atmospheric (or even sub-atmospheric) to several hundred pounds per square inch, will usually suffice, although there is no objection to higher pressures, if for any reason such are desired.

After the desired amount of polymer is formed, the catalyst is inactivated, e.g., by addition of a small amount of methanol or other alcohol, and the polymer is recovered from the mixture by well-known methods which need not be described here.

Many catalyst systems and polymerization methods are known which polymerize butadiene, and some of these are capable of giving highly stereo-specific polybutadiene, i.e., polybutadiene in which the butadiene monomer units are predominantly in the cis-1,4, the trans-1,4, or the 1,2 configuration. It is also well known to copolymerize butadiene with other copolymerizable monomers. However, none of the prior art catalysts and methods give copolymers in which the butadiene monomer units are predominantly in the cis-1,4 configuration. Friedel-Crafts catalysts by themselves, for example, give butadiene polymers with a high trans-1,4 content; and catalysts of the well-known free radical type give butadiene polymers with considerable proportions of all three configurations, usually with a major proportion of the trans-1,4 configuration. It is an advantage of the catalyst and method of the present invention that butadiene copolymers can be made in which the butadiene unit configuration is predominantly cis-1,4.

The following examples illustrate the practise of the invention, it being understood that the invention is not limited to these examples, nor otherwise except as stated in the specification and claims.

*Example 1*

One gram of $(\phi_3P)_2Ni(SCN)_2$ (bis-triphenylphosphine nickel dithiocyanate) and .5 gram of $AlCl_3$ were mixed under nitrogen in 200 ml. of dry benzene in a soda bottle of approximately 700 ml. capacity at about 25° C. One hundred ml. of butadiene liquid were then added to the bottle and it was capped. It was shaken on a rocker in a bath maintained at a temperature of 50° C. for 120 hours. The solution was then poured into a beaker containing 500 ml. of methanol and .5 gram of antioxidant (phenyl-beta-naphthylamine). About one gram of high molecular weight polybutadiene with 70% cis-1,4, 26% trans-1,4 and 4% 1,2 structure (as estimated from the infrared spectrum) was separated from the methanol/benzene solution.

*Example 2*

The same procedure, ingredients, and amounts thereof were used as in Example 1, except that one gram of bis-triphenylphosphine nickel dichloride $(\phi_3P)_2NiCl_2$ was substituted for the dithiocyanate complex. Polybutadiene was produced which showed 70% cis-1,4, 26% trans-1,4, and 4% 1,2 structure.

*Example 3*

One gram of $(\phi_3P)_2NiCl_2$, 0.3 gram of $AlCl_3$, and 0.2 ml. of n-butyl chloride were added to 200 ml. of benzene in a soda bottle of about 700 ml. capacity. One hundred ml. of butadiene were then added to the solution and the bottle was capped. After 48 hours in a thermostated rocker bath maintained at a temperature of 50° C. the solution was coagulated as above and substantially complete conversion of butadiene to high molecular weight polybutadiene, having 43% cis-1,4, 52% trans-1,4 and 5% 1,2 structure, was obtained.

*Example 4*

This example was carried out exactly as described in Example 3, except that 100 ml. of isoprene was substituted for 100 ml. of butadiene. High molecular weight polyisoprene of mixed cis-1,4; trans-1,4; 1,2; and 3,4 structure was obtained.

*Example 5*

This example was carried out exactly as described in Example 3, except that 100 ml. of styrene was substituted for 100 ml. of butadiene. High molecular weight polystyrene was obtained.

*Example 6*

This example was carried out exactly as described in Example 3, except that 73 grams of isobutylene was substituted for the 100 ml. of butadiene. High molecular weight polyisobutylene was obtained.

*Example 7*

This example was carried out exactly as described in Example 3, except that 58 grams of propylene was substituted for the 100 ml. of butadiene. High molecular weight polypropylene was obtained.

*Example 8*

One gram of $(\phi_3P)_2NiI_2$, 0.3 gram $AlCl_3$, 0.2 ml. n-butyl chloride, 200 ml. benzene and 100 ml. butadiene were placed in a soda bottle of approximately 700 ml. capacity under a nitrogen atmosphere. The bottle was then capped and placed in a theromstated rocker bath maintained at a temperature of 50° C. for 48 hours. High-cis, high molecular weight polybutadiene was separated from the reaction product by coagulation with methanol. Structure of the polymer was 75% cis-1,4, 19% trans-1,4 and 6% 1,2.

*Example 9*

0.05 gram of $(Bu_3P)_2NiCl_2$ (bis-tri-n-butyl phosphine nickel dichloride), .05 gram $AlBr_3$, 0.1 ml. n-butyl chloride, 200 ml. benzene and 100 ml. butadiene were placed in a soda bottle of approximately 700 ml. capacity under a nitrogen atmosphere. The bottle was then capped and placed in a thermostated rocker bath maintained at a temperature of 50° C. for 16 hours. Substantially complete conversion of monomer to high molecular weight polybutadiene was obtained by coagulation with methanol. Structure of the polymer was 45% cis-1,4, 51% trans-1,4 and 4% 1,2.

*Example 10*

One ml. of $BF_3OEt_2$ (boron trifluoride diethyletherate), 0.3 gram of $(Bu_3P)_2NiCl_2$, 200 grams of benzene and 75 grams of butadiene were placed in a soda bottle of approximately 700 ml. capacity under a nitrogen atmosphere. The bottle was then capped and placed in a thermostated rocker bath at 50° C. for 90 hours. High molecular weight polybutadiene was obtained by coagulation with methanol. Structure of the polymer was 60% cis-1,4, 35% trans-1,4, and 5% 1,2.

*Example 11*

0.3 gram of $(Bu_3P)_2NiCl_2$, 1 ml. of $BF_3OEt_2$, 100 grams of n-butyl chloride and 50 grams of butadiene were placed in a soda bottle of approximately 700 ml. capacity under a nitrogen atmosphere. The bottle was then capped and placed in a rocker bath maintained at a temperature of 50° C. for 16 hours. High molecular weight polybutadiene was obtained after coagulation in methanol. Structure of the polybutadiene was 79% cis-1,4, 19% trans-1,4 and 2% 1,2.

*Example 12*

0.1 gram of $(\phi_3P)_2NiCl_2$, 0.1 gram of $AlCl_3$, 10 ml. of $CH_2Cl_2$, 250 ml. of benzene and 35 grams of butadiene were placed in a flask under a nitrogen atmosphere. Polymerization occurred within a few minutes at ambient temperature to form high molecular weight polybutadiene which was separated by coagulation in methanol. Structure of the polybutadiene was 55% cis-1,4, 41% trans-1,4 and 4% 1,2.

*Example 13*

0.5 gram of $(\phi_3P)_2NiI_2$, 0.5 gram of $TiCl_4$, 200 ml. of chlorobenzene and 20 grams of butadiene were placed in a bottle of approximately 700 ml. capactiy. The bottle was then capped and maintained at a temperaure of 50° C. for 48 hours. After this time three grams of high molecular weight polybutadiene were separated from the solution by coagulating in methanol. The structure of the polymer as shown by infrared anaylsis was 87% cis, 10% trans, and 3% 1,2.

*Example 14*

Copolymerization of butadiene and isobutylene. A catalyst solution was prepared by adding 3 grams of $AlCl_3$ and 1.5 grams of $(\phi_3P)_2NiCl_2$ to 150 ml. of dried $CH_2Cl_2$ at a temperature of about 25° C. Part of the solid aluminum and nickel compound dissolved to form a red solution. Fifty ml. of the red solution was placed in a flask under nitrogen and an equimolar mixture of butadiene/isobutylene was added. After about 30 minutes at ambient temperature high molecular weight copolymer in which the butadiene portion was high cis was separated by coagulation in methanol. Infrared analysis showed the coploymer to contain 58% isobutylene and 42% butadiene; the orientation of the butadiene units was 69% cis-1,4, 26% trans-1,4, and 5% 1,2.

*Example 15*

Copolymerization of butadiene and propylene. Approximately .15 g. of $(Bu_3P)_2NiCl_2$, .375 g. of $AlBr_3$, 116 g. benzene and .06 ml. of n-butyl chloride were placed in a bottle of about 700 ml. capacity under nitrogen. The bottle was then capped and 69 g. of a 50/50 mixture (by weight) of butadiene and propylene were added. After 2½ hours at room temperature 28 g. of copolymer was separated by methanol coagulation. Composition as shown by infrared analysis was 30% propylene and 70% butadiene; the orientation of the butadiene units was 67% cis-1,4, 29% trans-1,4 and 4% 1,2.

*Example 16*

0.1 gram of $(\phi_3P)_3CoCl_3$, 0.3 gram of $AlBr_3$, 200 ml. of $CH_2Cl_2$, and 50 ml. of chlorobenzene were stirred together in a 500 ml. flask under an atmosphere of nitrogen for a few minutes at room temperature. Butadiene gas was then bubbled through the stirred mixture for 10 minutes, after which the mixture was poured into 500 ml. of methanol containing 0.1 gram of antioxidant. The polybutadiene which separated had the following structure, as estimated from the infrared spectrum: cis-1,4, 80%; trans-1,4, 13%; 1,2, 6%.

*Example 17*

Example 16 was repeated, except that 0.1 gram of $(\phi_3P)_2CoI_2$ was used instead of $(\phi_3P)_2CoCl_2$. The polybutadiene formed had the structure: cis-1,4, 46%; trans-1,4, 42%; 1,2, 12%.

*Example 18*

100 ml. of chlorobenzene, 0.037 gram of $(\phi_3P)_2NiBr_2$, and 0.067 gram of $AlBr_3$ were mixed in a bottle under a nitrogen atmosphere, and about 10 grams of butadiene were injected into the mixture. After standing for 48 hours at room temperature, high molecular weight polybutadiene was separated from the mixture. The polymer structure was 81% cis-1,4; 16% trans-1,4; 3% 1,2.

Having thus described my invention, what I claim and desire to protect by Letters Patent is:

1. A method of coploymerizing butadiene with a co-monomer selected from the group consisting of styrene, isobutylene and propylene, comprising contacting the butadiene and said co-monomer, in admixture in an inert, dry, organic solvent medium, with a catalyst comprising the interaction product of an organo-phosphine-metal salt complex $(R_3P)_2MX_2$ and an acidic metal halide $M'X'_n$, in which R is a hydrocarbon radical selected from the group consisting of phenyl and butyl; M is selected from the group consisting of nickel and cobalt; X is selected from the group consisting of fluorine, chlorine, bromine, iodine, and thiocyanate; M' is a metallic element of valence $n$ whose halides are Lewis acids, and X' is selected from the group consisting of fluorine, chlorine and bromine, whereby a high molecular weight polymer, having an intrinsic viscosity of at least 0.1 in benzene, in which more than 40% of the butadiene units have the cis-1,4 configuration, is formed.

2. A method as in claim 1 in which M is cobalt.
3. A method as in claim 2 in which R is phenyl.
4. A method as in claim 2 in which R is n-butyl.
5. A method as in claim 1 in which M is nickel.
6. A method as in claim 5 in which R is phenyl.
7. A method as in claim 5 in which R is n-butyl.
8. A method as in claim 1 in which the said metal M' is aluminum.
9. A method as in claim 1 in which the said metal M' is boron.
10. A method as in claim 1 in which the said metal M' is titanium.
11. A method as in claim 1 in which the catalyst composition contains a halohydrocarbon.
12. A method is in claim 11 in which the said halohydrocarbon is n-butyl chloride.
13. A method as in claim 11 in which the said halohydrocarbon is methylene chloride.
14. A method as in claim 11 in which the said halohydrocarbon is chlorobenzene.

References Cited by the Examiner

UNITED STATES PATENTS

| | | | |
|---|---|---|---|
| 2,645,613 | 7/1953 | Adelson et al. | 260—439 |
| 2,993,035 | 7/1961 | Christman | 260—94.3 |
| 3,066,125 | 11/1962 | Porter et al. | 260—94.3 |
| 3,066,127 | 11/1962 | Carlson et al. | 260—94.3 |
| 3,066,128 | 11/1962 | Youngman | 260—94.3 |
| 3,072,630 | 1/1963 | Jong | 260—94.3 |
| 3,098,843 | 7/1963 | Luttinger | 252—431 |

JOSEPH L. SCHOFER, *Primary Examiner.*

S. H. BLECH, *Examiner.*